United States Patent [19]

Wood

[11] 4,137,606
[45] Feb. 6, 1979

[54] WEBBED HARNESSING DEVICE

[75] Inventor: William E. Wood, Hudson, Mass.

[73] Assignee: Dennison Manufacturing Company, Framingham, Mass.

[21] Appl. No.: 801,448

[22] Filed: May 27, 1977

[51] Int. Cl.² ............................................. B65D 63/00
[52] U.S. Cl. .................................................. 24/16 PB
[58] Field of Search .............. 24/17 AP, 16 PB, 16 R, 24/73 PB; 264/294

[56] References Cited

U.S. PATENT DOCUMENTS

| 3,717,906 | 2/1973 | Wells ................................ 24/16 PB |
| 3,973,292 | 8/1976 | Bonnet .............................. 24/16 PB |
| 4,003,106 | 1/1977 | Schumacher et al. ............ 24/16 PB |

*Primary Examiner*—Henry Jaudon
*Attorney, Agent, or Firm*—George E. Kersey

[57] ABSTRACT

A harnessing device formed by a locking head and an attached webbed strap. The head contains oppositely positioned locking tangs in a guide channel that receives the strap after encirclement of items to be harnessed. The tangs engage abutments of the webbed strap for adjustable retention of the harnessed items. The strap is advantageously molded of a stretch reorientable material. Stretching produces a relatively thin and strengthened web which resists penetration by the locking tangs and reduces the possibility of failure by fracture or reverse rotation. The inclusion of the relatively thin web also promotes homogeniety during molding and avoids imperfections that can cause failure in other types of straps.

8 Claims, 6 Drawing Figures

WEBBED HARNESSING DEVICE

BACKGROUND OF THE INVENTION

This invention relates to the harnessing of the items and more particularly to the realization of efficient, low-cost, high strength harnessing devices which are easy to use.

Harnessing devices are widely used for the bundling of objects. Such devices are typically formed with a serrated strap that is fitted to an apertured head containing an internal pawl or locking tang that engages the serrations of the strap. Other harnessing devices are in the form of an apertured strap fitted to a buckle-like head, with a tongue that enters the apertures of the strap.

Harnessing devices with serrated straps have the disadvantage of being only as secure as their pawls. Where the items that are harnessed are heavy or are subjected to rough handling, the items often become accidentally released, for example, by failure of the pawls. Attempts have been made to strengthen serrated strap devices, but this has resulted in considerable complexity without achieving the desired end result of providing security against accidental release of the harnessed items. Similar objections apply to harnessing devices with buckle-like heads. In these devices, a tongue which enters the strap apertures rests against the head of the buckle near its opening and is deflected by the strap. The tongue is typically a cantilever attachment to the buckle-like head, which tends to be unduly stiff in the direction of forward thrust during harnessing, and insufficiently stiff in the direction of reverse thrust applied by the strap because of the harnessed items. In addition the tongue is exposed to external interferences that can cause an accidental release of the harnessed items.

Representative harnessing devices are disclosed in U.S. Pat. Nos. 515,747; 2,977,145; 3,030,131; 3,106,028; 3,127,648; 3,140,139; 3,189,961; 3,339,246; 3,368,247; 3,486,201; 3,457,598; 3,537,146; U.S. Pat. No. Re 26,492; U.S. Pat. Nos. 3,542,321; 3,588,962; 3,598,442; 3,627,300; 3,654,669; 3,660,869; 3,731,347; 3,816,878; 3,840,256.

In order to avoid and overcome many of the difficulties associated with the foregoing kinds of harnessing devices, ladder straps and associated locking tangs have been developed of the kind disclosed in U.S. Pat. No. 3,766,608, which issued Oct. 23, 1973. The ladder strap device represents a significant improvement over the serrated strap and other harnessing devices. It can accomplish substantially the same functions as a serrated strap device at a considerably lower cost. The ladder strap can be produced with a significant saving in material and can be stretched to reorient its molecular structure and strengthen its constituents without strap distortion, as would occur if an attempt were made to stretch a serrated strap.

Notwithstanding its advantages, however, the ladder strap device requires a relatively massive locking tang or pawl in order to avoid failure from the reverse thrust of the items being harnessed. There are two kinds of pawl failure. The first is a loading failure by virtue of fracture of the pawl near its base. The second is "pawl pull". Here the reverse thrust produces a reverse rotation of the tang that is so great that the strap is released.

In addition the use of cross linked members to form the ladder portion of the strap requires care in molding to properly fill the mold and can also require special attention to the molding materials in order to achieve a satisfactory end product.

Accordingly, it is an object of the invention to provide for the secure harnessing of items. A related object is to achieve secure harnessing without the need for a complex harness configuration.

A further object of the invention is to reduce the strength characteristics needed for a locking pawl in a harnessing device of the ladder type. A related object is to achieve a less stringent locking pawl requirement while retaining the advantages of a ladder strap.

Another object of the invention is to reduce the material and molding requirements associated with the filling of molds and the production of harnessing devices. A related object is to reduce molding and material requirements in the manufacture of ladder strap harnessing devices.

SUMMARY OF THE INVENTION

In accomplishing the foregoing and related objects the invention provides a harnessing device with a head that contains a guide channel and opposed locking tangs. A strap in the form of a ladder structure is used to encircle the items to be harnessed and it extends at an angle from the locking head with respect to its longitudinal channel. Each active rung of the strap contains abutments for engaging the locking tangs at a position between the center line of the strap and the outer periphery of the rung. The strap additionally is webbed between the rungs. The webbing reduces the force required for insertion of the strap into the head and limits the tendency of thrust applied to the strap from fracturing the pawl or producing counter rotation.

The inclusion of webbing further permits the strap to be molded with an improved filling characteristic. The webbing region of the mold serves as a channel for the flow of the molding material to the rungs thus assuring complete filling of each rung cavity. The webbing also limits the occurrence of such imperfections as voids, "nits" and "cold shuts". Voids are produced by gaseous bubbles during turbulent flow of the mold mixture. A "nit" is an imperfection in the surface of the molded part particularly a surface discontinuity in the nature of a stress crack. The webbing produces strengthening of the overall structure and is stretchable in the case of molecular reorientable materials to provide increased strength per unit area. A "cold shut" is a molding discontinuity that occurs because of premature chilling which forms a skin-like layer of material that is not integrally tied to the remainder of the structure. The additional flow of material because of the webbing channel permits the completion of filling before chilling takes place.

DESCRIPTION OF THE DRAWINGS

Other aspects of the invention will become apparent after considering several illustrative embodiments taken in conjunction with the drawings in which.

DETAILED DESCRIPTION

Figure 1A:
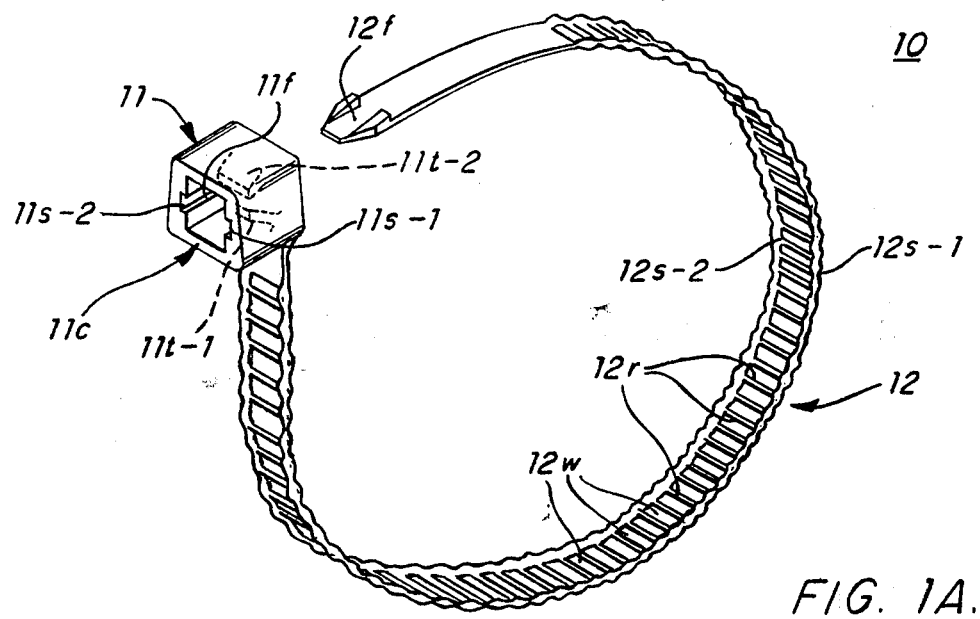
FIG. 1A is a perspective view of a webbed harnessing device in accordance with the invention.

As shown in FIG. 1A, a webbed harnessing device 10 in accordance with the invention includes a head 11 and an attached strap 12. The strap 12 is in the form of a ladder structure with side rails 12s-1 and 12s-2 and rungs 12r. Each region between adjoining rungs includes relatively thin webbing 12w. The free end 12f of the strap 12 is insertable into a channel 11c of the head 11 to engage deflectable locking tangs or pawls 11t-1 and 11t-2.

Figure 1B:
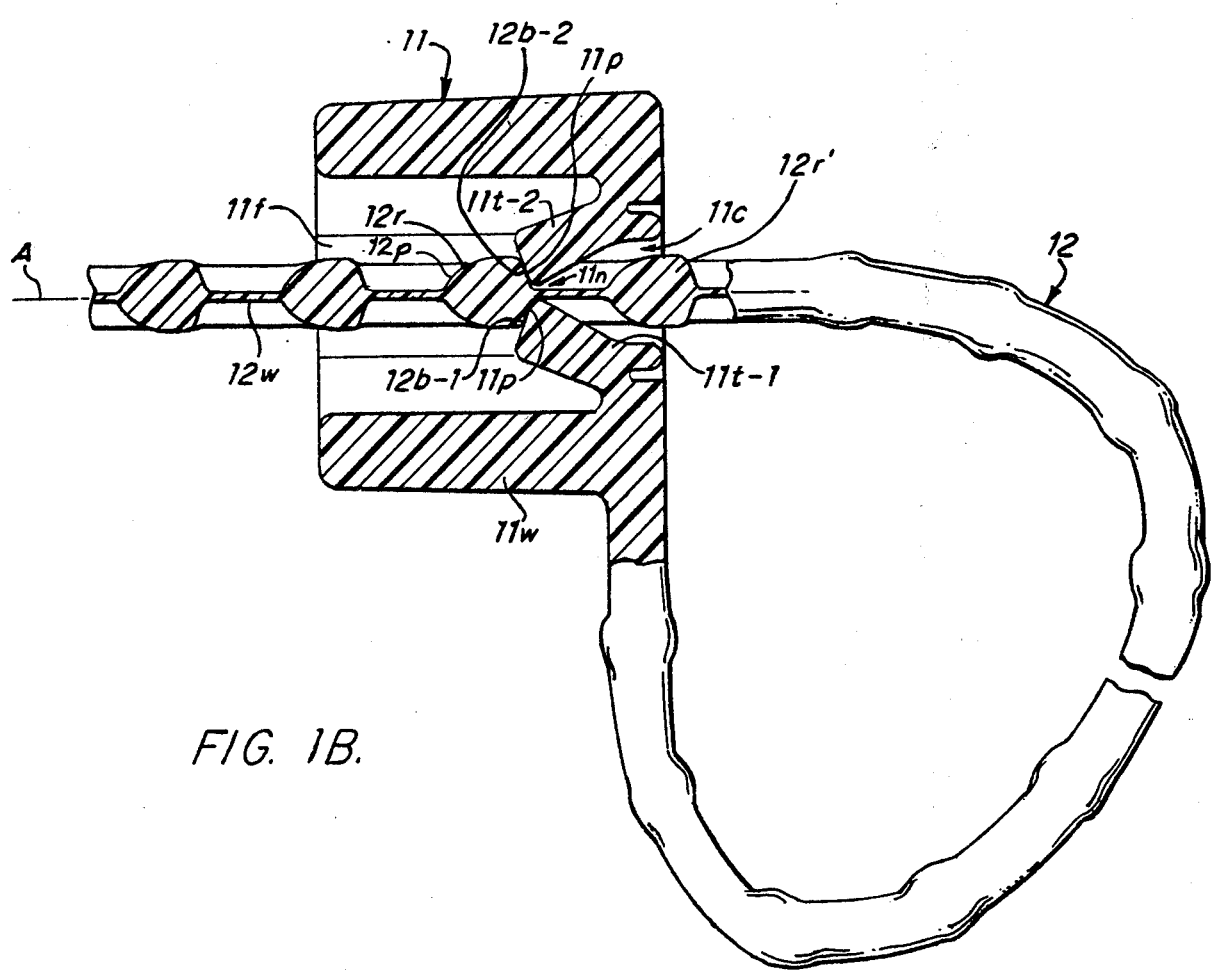
FIG. 1B is a partial cross sectional view of the device of FIG. 1A.

In the sectional view of FIG. 1B, the locking tangs 11t-1 and 11t-2 are shown in engagement with abutments 12-b-1 and 12b-2 of a rung 12r. Because of the webbing 12w each of the locking tangs 11t-1 and 11t-2 cannot move beyond the center line A of the channel 11c. This facilitates the insertion of the strap 12 since only a slight deflection of the locking tangs 11t-1 and 11t-2 is needed to clear the protuberance 12p of the succeeding rung 12r'. If the webbing 12w were omitted it would be possible for the locking tangs 11t-1 and 11t-2 to move through a large arc extending from a flange 11f to the lower wall 11w. The web 12w is of a substantially constant thickness which is sufficient to resist penetration by the locking tangs 11t-1 and 11t-2 as the strap is drawn by successive abutments over the tips 11p of each tang. When the web is strengthened by stretching after molding it can become translucent, and even transparent, even if the remainder of the device is not. A suitable thickness for the web has been found to be between 2 and 7 mils, with the range from 3 to 5 mils being preferred.

It is also desirable for the thickness of the web to be related to the thickness of the associated rungs. A suitable web-rung ratio is in the range from about 1:2 to about 1:6 with the range of about 1:3 to 1:5 being preferred. The spacing of the rungs along the straps is desirably such that at least one of the rungs 12r is included within the head 11, although the rungs may be more closely spaced in order to provide a closer control over the closure about the articles being encircled.

Since the presence of the web prevents the locking tang 11t from adopting an angle of inclination with respect to the wall 11w greater than 45°, the tang may be significantly reduced in mass for a prescribed resistance to tang failure and reverse tang pull. The particular tang 11t of FIG. 1B includes a tip 11p which is proportioned to provide substantial contact engagement with each abutment 12b. In addition the tang 11t includes a neck portion 11n which is narrower than the extension of the tang into the channel 11c. This further facilitates insertion of the strap 12 into the channel. The particular tang 11t of FIG. 1B forms an angle of less than 30° with respect to the axis A to increase the resistance of the tang 11t to failure and reverse pull.

The head 11 additionally includes a central flange 11f which provides a cam surface directly opposite the position of contact between the engaged rung 12r and the locking tangs 11t-1 and 11t-2. The flange 11f is flanked by side channels 11s-1 and 11s-2 (FIG. 1A) above the positions occupied by the side rails 12s-1 and 12s-2. This increases the degree of contact between the strap and the tang and consequently helps prevent failure by reverse pawl pull.

The provision of the webbing 12w facilitates production of the device 10 with improved operating, molding and stretching characteristics. Because of the web 12w the material inserted into the mold, which is advantageously accomplished by injection molding, has an enlarged channel for the flow of material, as compared with the standard ladder structure. The result is that imperfections that often attend molding such as cold shuts, voids and nit marks are either eliminated or significantly reduced in extent.

Figure 2A:
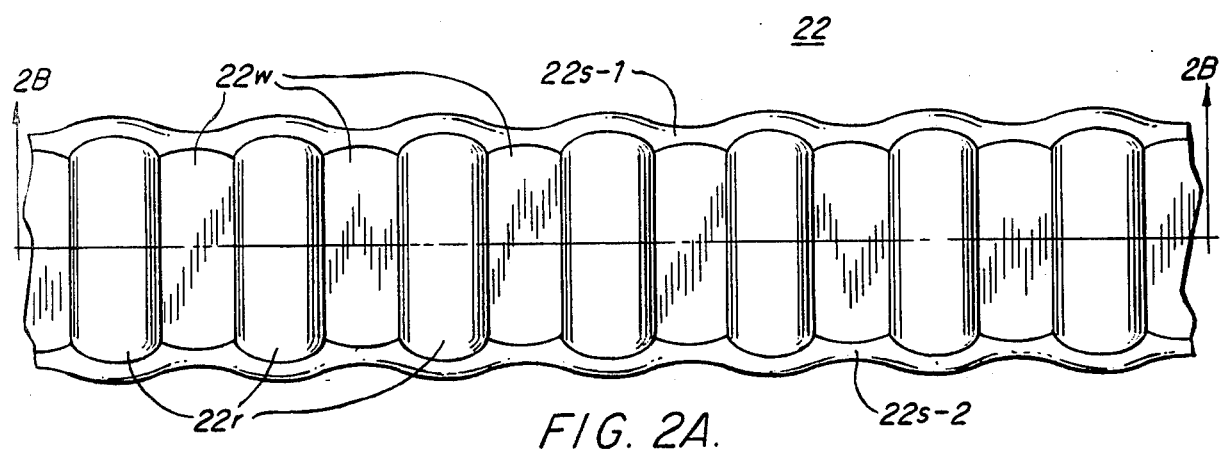
FIG. 2A is a plan view of a portion of the device of FIGS. 1A and 1B.
Figure 2B:
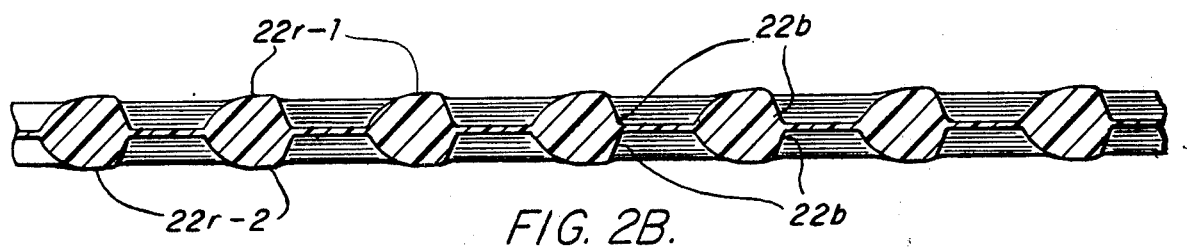
FIG. 2B is a sectional view of FIG. 2A.

In those cases where the strap 12 is to be stretched it is desirable for the material to be of molecular reorientable type, such as nylon, polypropylene, polyester, urethane, or the like. This material, upon stretching, not only reduces the volume per unit length of the strap, as indicated in FIGS. 2A and 2B but also provides enhanced physical properties. For example there is increased strength in tensile and shear strength.

The configuration of a portion 22 of a strap stretched in accordance with the invention is set forth in plan view in FIG. 2A and in section in FIG. 2B. The portion 22 includes side rails 22s-1 and 22s-2 and rungs 22r. A stretched web 22w extends between each pair of adjoining rungs. The stretching produces scalloped edges on the strap 22, with the side rails 22s-1 and 22s-2 being reduced in diameter between adjoining rungs 22r. The upper portion 22r-1 of each rung 22r in FIG. 2B can be carried by the central flange member 11f shown in FIG. 1B; the lower portion 22r-1 contains abutments 22b for engagement by the locking tang 11t of FIG. 1B.

Figure 3A:
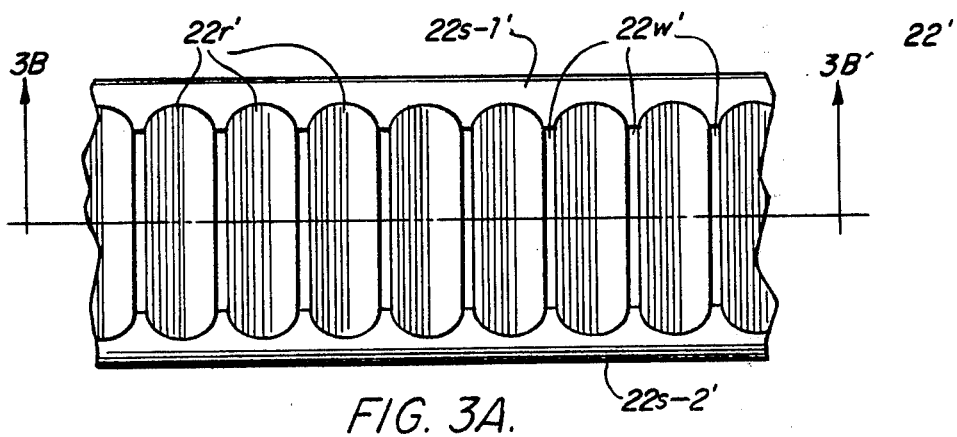
FIG. 3A is a plan view of an unstretched version of the device of FIG. 2A.
Figure 3B:
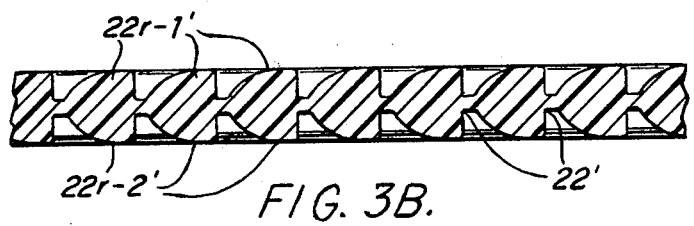
FIG. 3B is a sectional view of FIG. 3A.

The device 10 may also be used with an unstretched strap, in the form removed from the mold, in which case a representative portion 22' of the unstretched strap is as shown in FIGS. 3A and 3B. The spacing between adjoining rungs 22r' can be controlled by controlling the extent of strap stretching.

The webbing 22w and 22w' is shown as filling the entire interval between each pair of adjoining rungs, but it will be understood that the web may extend only a portion of the inter-rung distance and may be detached from the side rails.

While various aspects of the invention have been set forth by the drawings and the specifications, it is to be understood that the foregoing detailed description is for illustration only and that various changes in parts, as well as the substitution of equivalent constituents for those shown and described, may be made without departing from the spirit and scope of the invention as set forth in the appended claims.

What is claimed is:

1. A harnessing device comprising a head having an elongated guide channel extending therethrough,
   a pair of deflectable locking tangs within said head,
   and a strap formed by a ladder structure with rungs which are sequentially engaged by the locking tang when the strap is inserted into the channel,
   said ladder structure having a webbed portion substantially constant thickness extending from each rung to reduce the force for insertion of said strap into said channel and to limit the effect of reverse thrust applied to said strap in causing reverse rotation of said locking tang.

2. A harnessing device as defined in claim 1 wherein said device is molded from a stretch-reorientable material and the webbed portions of said strap is characterized by having permanent molecular reorientation caused by stretching,
   thereby to realize a relatively thin and strengthened member extending from each rung of said ladder for reducing the force required for insertion of said strap into said channel and limiting failure of said locking tang by rotation due to reverse thrust applied to said strap.

3. A harnessing device as defined in claim 1 wherein each rung of said ladder strap includes abutments for engagement by said locking tangs.

4. A harnessing device as defined in claim 1 wherein said webbed portion extends from one rung to another,
thereby to permit the load applied to one of said rungs by said locking tang to be distributed among other rungs.

5. A harnessing device as defined in claim 4 wherein said webbed portion further extends between adjoining rails of said ladder strap,
thereby to distribute the load applied by a locking tang in engagement with a rung of said strap among not only adjoining rungs but the associated structure thereof of said strap.

6. A harnessing device as defined in claim 1 wherein one end of said strap is attached to said head at an angle with respect to the axis of insertion of the other end of said strap to said channel.

7. A harnessing device as defined in claim 1 wherein each of said locking tangs has a tip that is proportioned to mate with abutments in said rung.

8. A harnessing device as defined in claim 1 wherein said locking tangs are integrally connected within said head by a neck portion which is narrower than the extension of said locking tangs into said channel,
thereby to facilitate the insertion of said strap into said channel,
and said extension of said locking tangs form an angle no greater than 30° with respect to the axis of said channel,
thereby to increase the resistance of said locking tangs to failure and reverse thrust rotation.

* * * * *